Figure 1:
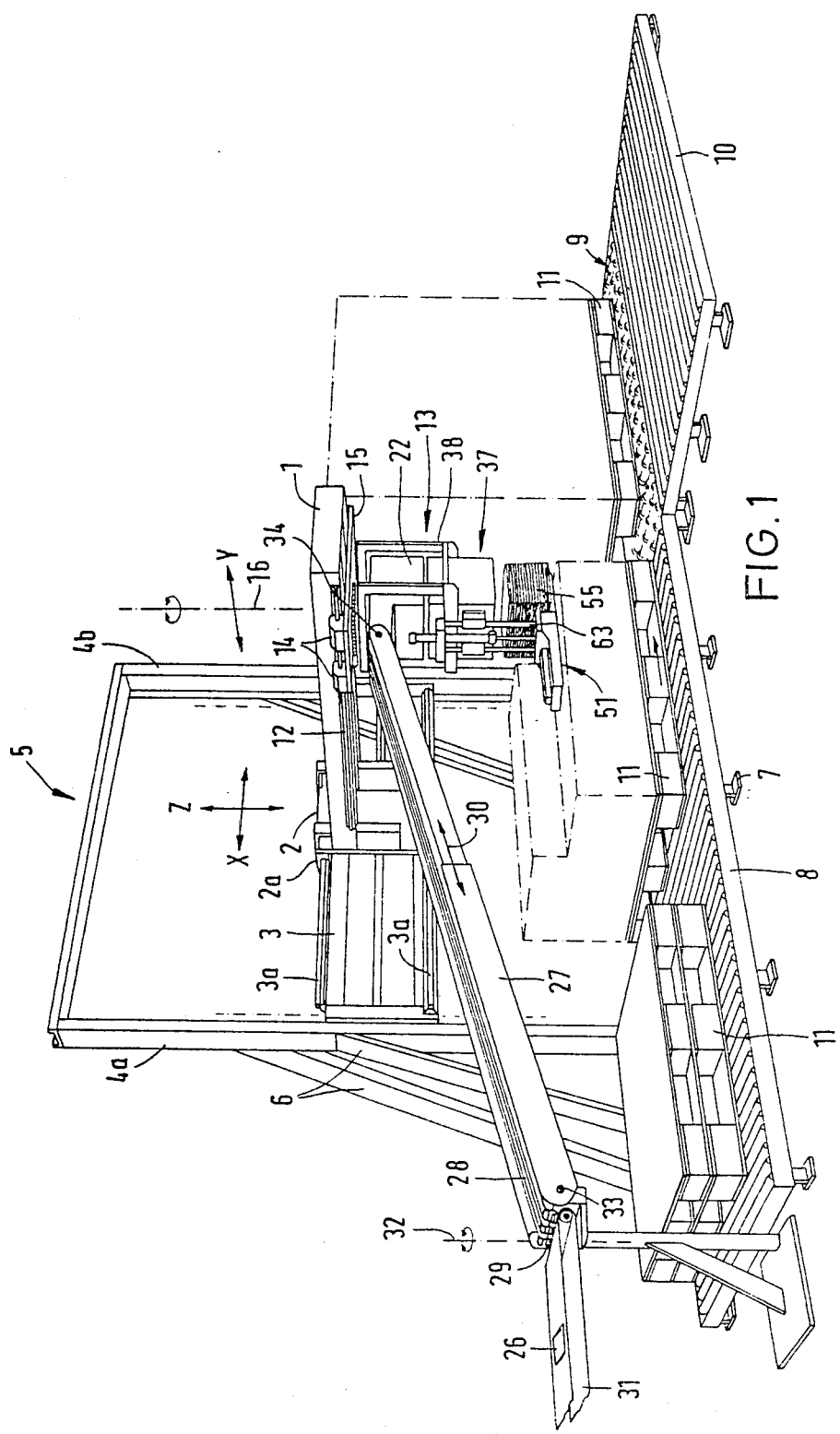

United States Patent [19]

Kwauka

[11] Patent Number: 4,820,104
[45] Date of Patent: Apr. 11, 1989

[54] DEVICE FOR THE STACKING AND/OR PALLETING OF, IN PARTICULAR, THIN PRODUCTS OF A PRINTING PRESS OPERATION

[75] Inventor: Gerd-Georg Kwauka, Gutersloh, Fed. Rep. of Germany

[73] Assignee: Mohndruck Graphische Betriebe GmbH, Fed. Rep. of Germany

[21] Appl. No.: 892,340

[22] Filed: Aug. 1, 1986

[30] Foreign Application Priority Data

Aug. 3, 1985 [DE] Fed. Rep. of Germany ....... 3527902

[51] Int. Cl.$^4$ ........................................... B65G 57/112
[52] U.S. Cl. .................................... 414/791; 414/907; 414/794; 414/788.3; 414/790.5; 414/792.8; 414/793.5
[58] Field of Search ........................ 414/52, 56, 62, 67, 414/54, 70, 77, 78, 80, 82, 84, 907

[56] References Cited

U.S. PATENT DOCUMENTS

| 3,921,825 | 11/1975 | Sheehan ................................. 414/62 |
| 4,082,194 | 4/1978 | Sheehan ................................. 414/62 |
| 4,383,788 | 5/1983 | Sylvander ........................... 414/84 X |
| 4,432,686 | 2/1984 | Feldkämper ........................... 414/77 |
| 4,614,473 | 9/1986 | Kwauka et al. .................. 414/84 X |
| 4,711,612 | 12/1987 | Kwauka ................................. 414/68 |

FOREIGN PATENT DOCUMENTS

| 3024133 | 1/1982 | Fed. Rep. of Germany . |
| 1395649 | 3/1965 | France ................................. 414/56 |
| 233741 | 3/1986 | German Democratic Rep. .................................... 414/114 |

Primary Examiner—Frank E. Werner
Assistant Examiner—Janice Krizek
Attorney, Agent, or Firm—Goodman & Teitelbaum

[57] ABSTRACT

The invention relates to a device for the stacking and-/or palleting of, in particular, thin products of a printing press operation, which is characterized by a gathering and depositing station rotatable about a vertical axis. The invention relates, further, to a process, preferably with use of the device, in which the products, for the formation of a preliminary stack, are rotated about an axis perpendicular to the plane of the products and thereupon gathered lying one upon another into the stack, which stack is transferred into a depositing shaft arranged vertically under the stack, turned back about this axis through at least the previous rotation, or through 90°, 180°, 270° plus or minus the preliminary rotation and then deposited.

47 Claims, 2 Drawing Sheets

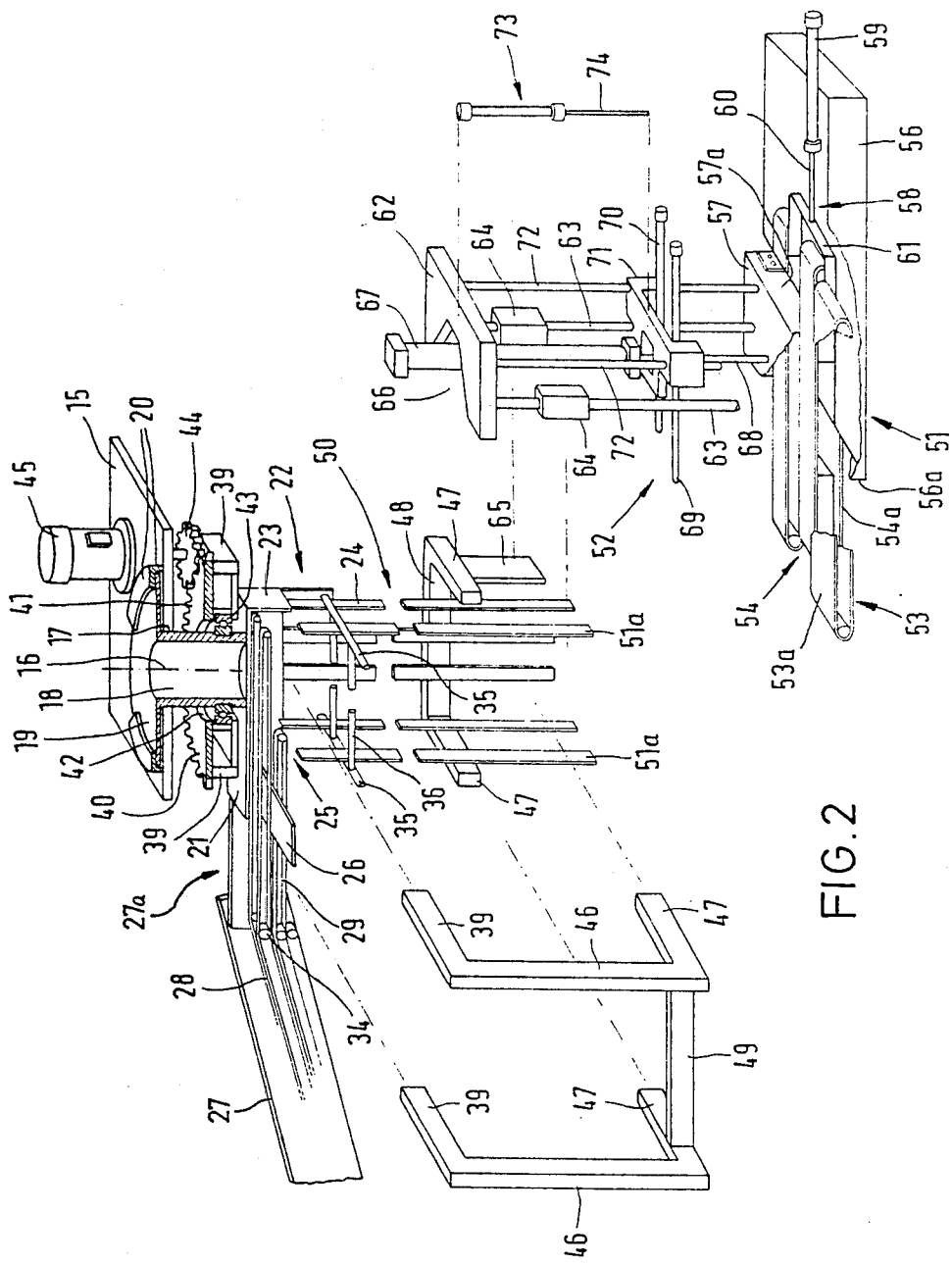

DEVICE FOR THE STACKING AND/OR PALLETING OF, IN PARTICULAR, THIN PRODUCTS OF A PRINTING PRESS OPERATION

The invention relates to a device and to a process for the stacking and/or palleting of, in particular, thin products of a printing press operation such as sheets, signatures and booklets, for example signatures, prospectuses, catalogues and periodicals.

A process is known in which signatures are brought up in fishscale stream over a feed belt and deposited into a shaft which has substantially the dimensions of the signatures. After formation of a stack of signatures in the shaft the stack is taken with gripping arms out of the shaft and deposited on another stack or a pallet. Through the arrangement of the gripping arms between which the signature stack is held there can occur in the depositing or withdrawing of the gripping arms displacement of the individual signatures with respect to one another and/or an insufficiently aligned depositing on a stack previously deposited.

Another stacking device for easily deformable goods, for example periodicals (German unexamined patent specification OS No. 30 24 133) is constructed in such a way that in the withdrawing of the carrying member the transport matter remains unaffected, i.e., in the withdrawing to the outside under the deposited stack in consequence of adhesion and friction the lowest sheet of the transported stack and/or the uppermost sheet of the already deposited stack is not carried along or damaged. For this purpose there is used as carrying member a double roller band system whose stringers which contact the product and are rolled off.

In a palleting device for book blocks or books (German patent specification P 34 11 295, the priority of which was claimed in corresponding U.S. patent application Ser. No. 716,362, now U.S. Pat. No. 4,711,612) it has been proposed to use an arrangement for the reception of a product layer that likewise consists of a double roller band system. The bands of the double roller band are driven oppositely in the withdrawal in such a way that the upper stringer of the upper band and the lower stringer of the lower band are rolled off, in which process at least the upper band stands still in the advancing of the double roller band relatively thereto.

With the known devices it is possible, to be sure, to set down stacks gently or to pallet product rows or layers gently and in the palleting to form gaps and/or after previous rotating of the individual products to pallet in conjunction during the transport to the device, but with the devices it is not possible to provide in the stack all the possibly requisite bond patterns in the palleting or positions of the products lying over one another, which assure a statically secure storage on a pallet or a better slab form of the stacks. In the case of thin products, furthermore, it has not hitherto been possible to pallet in one stage, i.e., without intermediate stacks.

The problem of the invention is to provide a device for the stacking and/or palleting of, in particular, thin products from printing press operations, with which it is possible in one stage, very accurately in any desired place on, for example, a pallet to position a stack of products in arbitrarily rotated position.

This problem is solved by the features of the present invention. Advantageous forms of execution of the invention are characterized below. With the aid of the drawing there is described in the following an example of execution.

FIG. 1 shows a perspective view of the device;
FIG. 2 shows an exploded representation of the construction of the depositing station, partially in section.

The device of the invention for stacking and/or palleting presents preferably a horizontally extending carrying arm 1. The carrying arm 1 abuts with one end frontally against a vertically arranged traverse 2 constructed about in plate form and is firmly joined with this. The traverse 2 has horizontally aligned rail chairs 2a. The rail chairs 2a are seated on likewise horizontally extending rails 3a of a slide piece 3 which consists substantially of a vertically standing cross piece, rectangular as viewed from the side of the carrying arm, to which, for example, there are fastened above and below the rails 3a, the rails 3a carrying over the rail chairs 2a and the traverse 2 with the carrying arm 1, and the traverse being borne movable back and forth on the rails 3a in the direction of the double-arrow X. For the moving of the traverse 2 with carrying arm 1 there are provided known drive means (which are not represented so that the perspicuity of the drawing remains preserved).

The slide piece 3 is borne in each case on end side travelable up and down in the direction of the double-arrow Z in or on the vertically standing columns 4a, 4b of a machine frame 5, which stands on the floor or is borne there, for which there serve corresponding struts 6 and bearing elements. Drive means (not represented) provide for the moving of the slide piece 3 in double-arrow direction Z.

The machine frame 5 is expediently combined with a roller track 8 resting on the floor, for example with supports 7, in front of the columns 4a, 4b under the carrying arm 1, said roller track 8 extending transversely or perpendicularly to the carrying arm 1, which roller track is preferably made longer than the distance apart of the columns 4a, 4b, but extends longer only on one side, and, namely, beyond the column 4a. To the roller track 8 at the other end, thereover extending beyond the column 4b, there can be connected a small-roller track 9 and at a right angle thereto there can be arranged a further roller track 10. The width of the roller tracks 8, 10 as well as of the small-roller track 9 corresponds about to the length of the carrying arm freely overhanging the roller train 8. The length of the carrying arm 1 is chosen in such a way that the carrying arm can overhang at least one pallet 11 present on the roller track 8.

Under the carrying arm 1 there is suspended the gathering and depositing station 13. For this purpose on the long sides of the carrying arm 1 there are arranged guide rails 12, on which there are borne slide blocks 14, which are fastened to a horizontally arranged carrying plate 15. The carrying plate 15 is located with small spacing under the carrying arm 1 and under it there is located the gathering and depositing station 13.

The slide blocks 14 communicate with drive means (not represented) so that the gathering and depositing station 13 is movable in double-arrow direction Y.

It is essential that the gathering and depositing station 13 is borne to turn about a vertical axis 16, preferably in such a way that it can be rotated about the vertical axis 16 positionally accurately through 90° to each side, preferably also through 180° to one or to both sides and/or also through 270° to one or both sides, so that the products present in it can assume a correspondingly rotated position.

A preferred form of execution of the gathering and depositing station 13 provides, arrayed among one another, a prestacking shaft 22 and a depositing shaft 37, of which the prestacking shaft 22 is swingable to both sides through a drag angle of about 0° to 10° and the depositing shaft 37 through 90° or 180° or 270°, preferably to both sides, inclusive of the compensation of the drag angle, so that the depositing shaft turns additionally to or minus the drag angle, borne turnably about the axis 16. A preferred construction of such a form of execution of the gathering and depositing station 13 is yielded, by way of example, from FIG. 2. There, in the carrying plate 15 there is present a hole 17 that is gripped through freely by a carrying pipe 18, which extends downward by a further amount. At the upper end of the carrying pipe 18 there is seated a circular annular disk 19, which extends at a right angle to the axis 16 and is supported on the surface of the carrying plate 15. The circular annular disk 19 presents slide means 20 which are present between the disk 19 and the surface of the carrying plate 15 and reduce the friction when the disk 19 rotates about the axis 16. Instead of the slide means there can also be provided rotary bearings or the like.

At the lower end of the carrying pipe 18 there is frontally seated a carrying plate 21, under which there is located the prestacking shaft 22. This prestacking shaft 22 is formed essentially by a vertical U-shaped frame 23 seated under the carrying plate 21, on the side walls of which frame there are fastened vertically downward-extending boundary bars 24, so that there is yielded a sort of inner space for the prestacking shaft 22, the bottom of which is open.

On one side of the prestacking shaft 22, to which the products are to be fed, there is provided a sort of slit 25, through which products are to be conveyed into the interior of the prestacking shaft 22.

For bringing up of the products 26 there serves, according to an advantageous form of execution of the invention, a telescopically constructed feed transport band 27 lengthenable or shortenable in double-arrow direction 30, with an upper band system 28 and a lower band system 29. The feed transport band 27 extends in the direction of the roller track 8 over the roller track 8 and takes over the products 26 from a conveyor belt 31 arranged in front, the products 26 being transported between the upper and lower band system clamping to the slit 25 of the prestacking shaft 22.

It is essential that the feed transport band 27 in the zone of transition from the transport band 31 is borne swingably about a vertical axis 32 and about a horizontal axis 33 lying transversely to the lengthwise extent of the band. Moreover, the other end of the feed transport band 27 is turnably borne on the prestacking shaft 22 with this about the axis 16, and, namely, about a horizontal axis 34 likewise lying transversely to the lengthwise extent of the feed transport band 27. It is advantageous if the feed transport 27 between the axis 34 and the prestacking shaft 22 presents a horizontally arranged zone 27a extending up to the prestacking shaft 22, so that the products reach the prestacking shaft 22 in a horizontal position. Preferably the sub-band system 29 ends at the slit 25, while the upper band system 28 extends into the interior of the prestacking shaft 22 (FIG. 2).

From the above-described arrangement and bearing of the feed transport band 27 and of the prestacking shaft 22 it results that in the traveling of the carrying arm 1 in X and Z direction the telescopic band 27 supported at the inflow can change in its length correspondingly and tilt about the axes 33 and 34 and can swing about the axes 16 and 32. In the traveling of the gathering and depositing station 13 on the carrying arm 1 in the Y-direction the prestacking shaft can swing about the axis 16, in which process the telescopic band 27 seated on the prestacking shaft 22 swings about the axis 32.

Expediently in the prestacking shaft 22 there is arranged a removable bottom bearing for the products, so that from the individually brought-up products a stack can be formed in the prestacking shaft 22. Preferably the bottom bearing presents two horizontal oppositely lying pivot bearing pins 35 arranged outside the prestacking shaft, on which there are arranged vertically descending fingers 36 which grip through the interspaces between the bars 24 and extend horizontally into the prestacking shaft 22. On these fingers 36 the products 26 rest during the stack formation. A swinging of the fingers 36 about the respective pivot bearing pin 35 downward frees the stack, which then slips into the depositing shaft 37 situated under it. For this purpose the pivot bearing pins 35 communicate with corresponding drive means (not represented), which bring about a swinging of the fingers 36 through 90° up and down or through 360°.

The depositing shaft 37 is turnable about the vertical axis 16 through 90° or 180° or 270°, preferably to both sides, plus or minus the drag angle of the prestacking shaft, so that products present in it are correspondingly rotated before the depositing. For this purpose an advantageous form of execution of the invention provides that between the carrying plate 15 and the carrying plate 21 a free space is left, in which arrangement outside on the carrying pipe 18 turnably about the vertical axis 16 there is borne a suspension frame 38, which grips about the prestacking arrangement and forms or carries the depositing shaft 37. This suspension frame 38 presents two horizontal upper longitudinal spars 39, arranged parallel with spacing on both sides beside the carrying pipe 18. On the spars 39 there is fastened, lying horizontally, a circular annular disk 40, which carries on the outside a gearing 41. The central opening 42 of the circular annular disk 40 is freely gripped through by the carrying pipe 18, there being arranged, however, between circular annular disk 40 and carrying pipe 18 a rotary carrying bearing, for example in the form of a ball bearing 43, which is seated firmly both on the circular annular disk 40 and also on the carrying pipe 18, so that the carrying pipe 18 bears the suspension frame 38 turnably about the vertical axis 16. In the toothed rim 41 there can grip a drive gear wheel 44 of a drive means, for example a motor 45, which is seated, for example, on the carrying plate 15.

At the one end of the upper longitudinal spars 39 there is arranged in each case a vertical spacer spar 46, which goes over at the lower end into in each case a lower horizontal longitudinal spar 47. The lower longitudinal spars 47 run in alignment under the upper longitudinal spars 39. Preferably, for reasons of stability, the ends of the lower longitudinal spars 47 are connected with one another over a transverse spar 48. A corresponding transverse spar can also be provided for the upper longitudinal spars 39. Furthermore, it is expedient to introduce a further transverse spar 49 between the lower longitudinal spars 47 in the zone of the rearward vertical spars 46. As viewed from the side, the suspension frame 38 is constructed substantially in C-shape, so that the interior of the suspension frame 38 is accessible and open from in front and from both sides, which is indicated by the arrow 50.

For the formation of the depositing shaft 37, as in the prestacking shaft 22, vertical bars 51a are fastened inside to the lower longitudinal spars 47. The spaced bars 51a align preferably with the bars 24 of the prestacking shaft 22.

The bottom of the depositing shaft 37 is formed preferably by roller band arrangement 51 with horizontally aligned roller bands movable forward and backward, borne on the suspension frame 38 and/or depositing shaft 37, for example. The roller band arrangement 51 is expediently borne to travel up and down and presents, moreover, a hold-down arrangement 52 for the stack formed, which has at its disposal advanceable and retractable hold-down devices and is preferably borne to move up and down on the roller band arrangement 51. Expediently the roller band arrangement 51 is equipped with a double roller band, and, namely, in the simplest case with two upper roller bands 52 for the support of the stack 55 formed and a lower roller band 54 to hold down the stack on which the depositing is to take place.

The double roller band represented has two upper, laterally spaced roller bands 53 and between these a lower roller band 54 arranged offset somewhat downward. There can, of course, be provided more than two upper roller bands and more than one lower roller band. The arrangement and guidance, however, as known per se, is such that the upper stringer 53a of the upper roller bands 53 and the lower stringer 54a of the lower roller band 54 stand still in the withdrawal of the roller bands, i.e. are rolled off, so that there takes place no relative movements between the product surfaces and the stringers mentioned in the depositing of the stack 55 present in the depositing shaft 37.

The bands 53, 54 of the roller band arrangement 51 can be borne on or upon a bearing plate 56, over which there is present another shorter bearing plate 57 supported on the former. To the back wall 47a of the bearing plate 57 there can be fastened, for example the upper roller bands 53 and to the front 56a of the bearing plate 56 there can be fastened the lower roller band 54. The moving stringers of the roller bands 53, 54 or the bearing elements of the bands are connected with a pulling or pushing arrangement 58, which may consist of a piston-cylinder unit 59 fastened to the bearing plate 56, the piston rod 60 of which is seated on a yoke communicating with the moving stringers. The means for driving the piston-cylinder unit 59 are not represented.

The roller band arrangement 51 is carried by an outside-lying lateral arrangement on the suspension frame 38. For this there are provided, for example, slide bars 63, which are laterally spaced from one another and stick with their lower end in the bearing plate 57 and with their upper end in a traverse 62 of U-shape in plan view. The slide bars 63 grip through in each case a slide block 64. The slide blocks 64 are fastened to one of the lower longitudinal spars 47 or to bearing plates 65 extending downward seated on them.

The roughly U-shaped recess 66 of the traverse 62 is gripped through by a vertically arranged piston-cylinder unit 67 supported, for example, on the traverse 62 or on the suspension frame 38, the downward extending piston rod 68 of the piston-cylinder unit 67 being connected with the bearing plate 57. Through a corresponding acting on the piston-cylinder unit 67 with means known per se (not represented), the roller band arrangement 51 can be raised or lowered, in which process the slide bars 63 slide in the slide blocks 64. Between the bars 51a of the depositing shaft 37 there are provided corresponding interspaces which can be gripped through freely by the roller bands, so that they can be moved in the interior of the depositing shaft 37 horizontally in and out as well as up and down unimpeded when they are present in the depositing shaft 37.

Expediently the roller band arrangement 51, as already mentioned, is equipped with a hold-down arrangement 52, which can present, for example, rods 69 arranged horizontally over the roller bands 53, 54, pointing in longitudinal direction of the bands. Each bar 69 is seated, for example, on the piston of a piston-cylinder unit 70 which is borne horizontally on a traverse 71 that is is present under the traverse 62 and is borne movable up and down. With drive means known per se (not represented) the piston-cylinder units 70 can be operated so that the rods 69 are movable forward and back. The bearing of the hold-down arrangement 52 occurs on slide bars 72 which are spaced from one another and from the slide bars 63, which pass through the traverse 71 and likewise fit in the traverse 62 as well as in the carrying plate 57. For the upward and downward movement there is provided a further piston-cylinder unit 73, which is seated extending vertically downward under or on the traverse 63 and whose piston rod 74 is connected with traverse 71. In the traveling out and in of the piston rod the hold-down arrangement 52 is correspondingly moved up and down with drive means known per se (not represented).

It lies within the scope of the invention to equip the prestacking shaft and/or the depositing shaft with jolters or press-down arrangements known per se. It lies further within the scope of the invention to use, instead of a carrying arm movable forward and back as well as up and down, or the depositing station movable back and forth on the carrying arm 1, an arrangement that moves the pallet correspondingly under the depositing station. With the depositing station then the stacked products are with their transport position or in a previously selected rotated position on the positioned pallet. Moreover, it lies within the scope of the invention to construct the side-wall arrangements of the prestacking shaft and of the depositing shaft slidable parallel outward or inward, in order to arrange the interior space of the shaft for different dimensions of the products to be stacked. Instead of the hold-down rods 69 there can be used a roller band system that is constructed in correspondence to the roller band system 51. This form of execution of the hold-down arrangement is suitable when the products to be stacked are especially smooth and/or there is still much air between and/or inside the products. There can also be provided, however, a roller band system arranged like a continuous elevator, in which the double roller bands serve simultaneously both for the holding down of the stack in the depositing shaft and for the support for the stack to be formed in the prestacking shaft. Or there can be arranged two roller band systems lying opposite one another, which are alternately driven into the interior space between prestacking shaft and depositing shaft.

It is essential that with the device of the invention virtually any setting pattern can be realized, so that not only form-stable stacks, but also form stable depositings can be carried out on a pallet, which can be individually attuned to the product to be stacked. The products are conveyed on a direct path to the predetermined place on the pallet by means of a telescopically extensible, swingable and adaptable conveyor band, prestacked in a connecting shaft and from there by means of a swinging frame deposited in the desired angular and coordinate position. The roller band system provides therefor an especially gentle contacting of the products. The desired angle of rotation for the products can be set automatically, for which purpose there serves the drive means 45. There the follow-up angle is automatically taken into account which the prestacking shaft occupies at a certain position on the carrying arm.

The stacked products do not have to be deposited on pallets, but can also be fed to other transport systems, as for example, to transport bands, the device of the invention always being used when the stacks are to be further processed with different angles of rotation. Obviously it is also possible to arrange products rotated differently within a stack, i.e. after, say, a reception of half a stack to turn the depositing shaft through 180° and to take up the next part of the stack and then to deposit both in common. Such a palleting process was hitherto not possible.

Instead of the roller bands, rollers can be used which fulfill the same purpose.

I claim:

1. A device for stacking and/or palleting of, in particular, thin products of a printing press operation, comprising:
    a gathering and depositing station (13) rotatable about a vertical axis (16);
    said gathering and depositing station (13) including a prestacking shaft (22) and a depositing shaft (37);
    said prestacking shaft (22) being arranged vertically over said depositing shaft (37) whereby products are fed into the prestacking shaft to form a stack which is then released to fall into the depositing shaft;
    first means for rotating said prestacking shaft (22) about said vertical axis (16) relative to and independently of said depositing shaft (37);
    said first means including a first carrying plate (15) of said device arranged over said gathering and depositing station (13), a carrying pipe (18) extending freely downwardly through a hole (17) provided through said first carrying plate (15) so that a lower end of said carrying pipe (18) is below said first carrying plate (15) and so that said carrying pipe (18) can rotate relative to said first carrying plate (15);
    an upper end of said carrying pipe (18) being provided with a circular annular disk (19) disposed at a right angle to said vertical axis (16), said circular annular disk (19) being rotatably supported on an upper surface of said first plate (15);
    a second carrying plate (21) being seated on said lower end of said carrying pipe (18) so that said second carrying plate (21) can rotate together with said carrying pipe (18);
    said prestacking shaft (22) being connected to said lower end of said carrying pipe (18) by said second carrying plate (21) securely mounted therebetween so that said prestacking shaft (22) also rotates with said carrying pipe (18); and
    second means for rotating said depositing shaft (37) about said vertical axis (16) relative to and independently of said prestacking shaft (22).

2. Device according to claim 1, characterized in that the circular annular disk (19) presents sliding means (20) which are located between the disk (19) and the surface of the first carrying plate (15).

3. Device according to claim 1, characterized in that the prestacking shaft (22) is formed essentially by a vertical U-shaped frame (23) seated under the second carrying plate (21), to the side walls of which frame there are fastened bounding bars (24) extending vertically downward and which are spaced apart.

4. Device according to claim 1, characterized in that the prestacking shaft (22) presents on the side to which the products are to be fed a slit (25) through which the products are conveyed into the interior of the prestacking shaft (22).

5. Device according to claim 1, characterized in that the prestacking shaft (22) has a removable bottom bearing for the products.

6. Device according to claim 5, characterized in that the bottom bearing (2) presents horizontal swinging bearing pivots (35) lying opposite one another, arranged outside the prestacking shaft (22), on which pivots (35) there are arranged descending fingers (36) that grip through interspaces between boundary bars (24) and extend horizontally into the prestacking shaft (22).

7. Device according to claim 6, characterized in that the swinging bearing pivots (35) are borne swingably about their horizontal longitudinal axis.

8. Device according to claim 1, characterized in that the depositing shaft (37) is borne turnably about the vertical axis (16) through 90° and/or 180° and/or 270°, preferably to both sides, plus or minus a drag angle.

9. Device according to claim 1, characterized in that between the first carrying plate (15) and the second carrying plate (21) a free space is left, in which arrangement on the outside of the carrying pipe (18), rotatably about the vertical axis (16), there is borne a suspension frame (38), which grips around said prestacking shaft arrangement and which carries said depositing shaft (37).

10. Device according to claim 9, characterized in that the suspension frame (38) has two horizontal upper longitudinal spars (39) spaced on both sides beside the carrying pipe (18), on one end of which spars in each case there is arranged a vertical spacer spar (46), the spacer spars (46) go over at the lower end into in each case a lower horizontal spar (47) and the lower horizontal spars (47) run in alignment under the upper longitudinal spars (39).

11. Device according to claim 10, characterized in that the ends of the lower horizontal spars (47) are connected with one another over a transverse spar (48), there being provided a corresponding transverse spar also for the upper longitudinal spars (39).

12. Device according to claim 10, characterized in that a further transverse spar (49) is introduced between the lower horizontal spars (47) in the zone of the vertical spacer spars (46).

13. Device according to claim 10, characterized in that on the spars (39) there is fastened, lying horizontally, a circular annular disk (40) which carries on the outside a gearing (41), a central opening (42) of the circular annular disk (40) is freely griped through by the carrying pipe (18) and between circular annular disk (40) and carrying pipe (18) there is arranged a rotary carrying bearing (43) which is seated firmly on the circular annular disk (40) as well as on the carrying pipe (18).

14. Device according to claim 13, characterized in that with the gearing (41) there engages a drive gear wheel (44) of a drive means (45) that communicates with the first carrying plate (15).

15. Device according to claim 10, characterized in that for the formation of the depositing shaft (37), as in the case of the prestacking shaft (22), vertical bars spaced (51a) are fastened inside to the lower horizontal spars (47), in which arrangement preferably the spaced bars (51a) align with boundary bars (24) of the prestacking shaft (22).

16. Device according to claim 1, characterized in that a bottom of the depositing shaft (37) is formed by a roller band arrangement (51).

17. Device according to claim 16, characterized in that the roller band arrangement (51) is borne on a suspension frame (38) and on the depositing shaft (37).

18. Device according to claim 16, characterized in that the roller band arrangement (51) is equipped with horizontally fitted roller bands movable forwardly and rearwardly.

19. Device according to claim 16, characterized in that the roller band arrangement (51) is borne to travel up and down.

20. Device according to claim 16, characterized in that the roller band arrangement (51) has a hold-down device (52).

21. Device according to claim 20, characterized in that the hold-down device corresponds to the roller band arrangement (51).

22. Device according to claim 16, characterized in that the roller band arrangement (51) is a double roller band.

23. Device according to claim 22, characterized in that the double roller band consists of two upper roller bands (53) and one lower roller band (54).

24. Device according to claim 23, characterized in that the upper roller bands (53) are laterally spaced and between these the lower roller band (54) is displaced somewhat downward.

25. Device according to claim 23, characterized in that an upper stringer (53a) of the upper roller bands (53) and a lower stringer (54a) of the lower roller band (54) stand still or are rolled off in the withdrawal of the roller bands.

26. Device according to claim 23, characterized in that the bands (53, 54) of the roller band arrangement (51) are borne on or upon a bearing plate (56), over which there is present a further shorter bearing plate (57) abutting on the former, in which system to a rear wall (57a) of the bearing plate (57) there are fastened the upper roller bands (53) and to a face front (56a) of the bearing plate (56) the lower roller band (54) is fastened, and in which the bearing elements of these bands are connected with a pulling or pushing arrangement (58).

27. Device according to claim 26, characterized in that the pulling or pushing arrangement (58) consists of a piston-cylinder unit (59), a piston rod (60) of which is seated on a yoke (61) communicating with the bearing elements of the stringers.

28. Device according to claim 16, characterized in that the roller band arrangement (51) is carried by an outside-lying lateral arrangement on a suspension frame (38).

29. Device according to claim 28, characterized in that said lateral arrangement includes slide bars (63) that are arranged with lateral spacing from one another and fit with their lower ends in a bearing plate (57) and with their upper ends in a traverse (62) preferably U-shaped in plan view, the slide bars (63) each grip through a slide block (64) and the slide blocks (64) are fastened to downward-extending bearing plates (65) or the like seated on them.

30. Device according to claim 29, characterized in that a roughly U-shaped recess (66) of the traverse (62) is gripped through by a vertically arranged piston-cylinder unit (67) abutting on the suspension frame (38), in which arrangement a downward-protruding piston rod (68) of the piston-cylinder unit (67) is connected with the bearing plate (57).

31. Device according to claim 18, characterized in that between bars (51a) of the depositing shaft (37) there are provided corresponding interspaces that can be gripped through freely by the roller bands.

32. Device according to claim 23, characterized in that a hold-down arrangement (52) presents rods (69) horizontally aligned over the roller bands (53, 54) and pointing in the longitudinal direction of the bands and preferably each rod (69) is seated on a piston of a piston-cylinder unit (70) that is borne horizontally on a traverse (71) that is located under a traverse (62) and is borne to move up and down.

33. Device according to claim 32, characterized in that a bearing of the hold-down arrangement (52) occurs on slide bars (72) that are spaced from one another and from slide bars (63), grip through the traverse (71) and fit in the traverse (62) as well as in a carrying plate (57), a further piston-cylinder unit (73) being provided for up-and-down movement, which is seated, extending vertically downward, under or on the traverse (62) and whose piston rod (74) is connected with the traverse (71).

34. Device according to claim 1, characterized in that for feeding in products (26) there is provided a telescopically constructed, lengthenable or shortenable feed transport band (27).

35. Device according to claim 34, characterized in that the feed transport band (27) has an upper band system (28) and a lower band system (29).

36. Device according to claim 34, characterized in that the feed transport band (27) is borne on the prestacking shaft (22) and is rotatable with this about the axis (16).

37. Device according to claim 34, characterized in that the feed transport band (27) in an inflow zone of the products is swingably borne about a vertical axis (32) and about a horizontal axis (33) lying transversely to a longitudinal extent of the band.

38. Device according to claim 37, characterized in that the feed transport band (27) at another end is swingable about a horizontal axis (34) likewise lying transversely to the longitudinal extent of the feed band.

39. Device according to claim 38, characterized in that the feed transport band (27) presents between the axis (34) and the prestacking shaft (22) a horizontally arranged zone (27a) connected with the prestacking shaft (22)

40. Device according to claim 35, characterized in that the lower band system (29) ends at a slit (25) and and the upper band system (28) extends into an interior of the prestacking shaft (22).

41. Device according to claim 1, characterized in that the gathering and depositing station (13) is suspended under a carrying arm (1) which extends horizontally.

42. Device according to claim 41, characterized in that on lengthwise sides of the carrying arm (1) there are arranged guide rails (12) on which there are borne slide blocks (14) which are fastened to said horizontally arranged first carrying plate (15), the first carrying plate (15) being located with slight spacing under the carrying arm (1) and the gathering and depositing station (13) being located under the first carrying plate (15).

43. Device according to claim 41, characterized in that the carrying arm (1) is arranged to travel laterally back and forth as well as up and down.

44. Device according to claim 43, characterized in that the carrying arm (1) abuts with one end frontally against a vertically arranged traverse (2) constructed in plate form and is firmly joined with this, the traverse (2) having horizontally aligned rail chairs (2a) which are seated on likewise horizontally extending rails (3a) of a slide piece (3) to which there are fastened above and below the rails (3a), the rails (3a) carrying over the rail chairs (2a), the traverse (2) with the carrying arm (1).

45. Device according to claim 44, characterized in that the slide piece (3) is borne to move up and down.

46. Device according to claim 45, characterized in that the slide piece is borne to travel up and down on vertically standing columns (4a, 4b) of a machine frame (5).

47. Device according to claim 46, characterized in that a machine frame (5) is combined with a roller track (8) resting in front of the columns (4a, 4b) under the carrying arm (1) on a floor having supports (7) and extending transversely or perpendicularly to the carrying arm (1) as a pallet transport arrangement, over which there is present also in longitudinal extent a telescopic band (27).

* * * * *